UNITED STATES PATENT OFFICE.

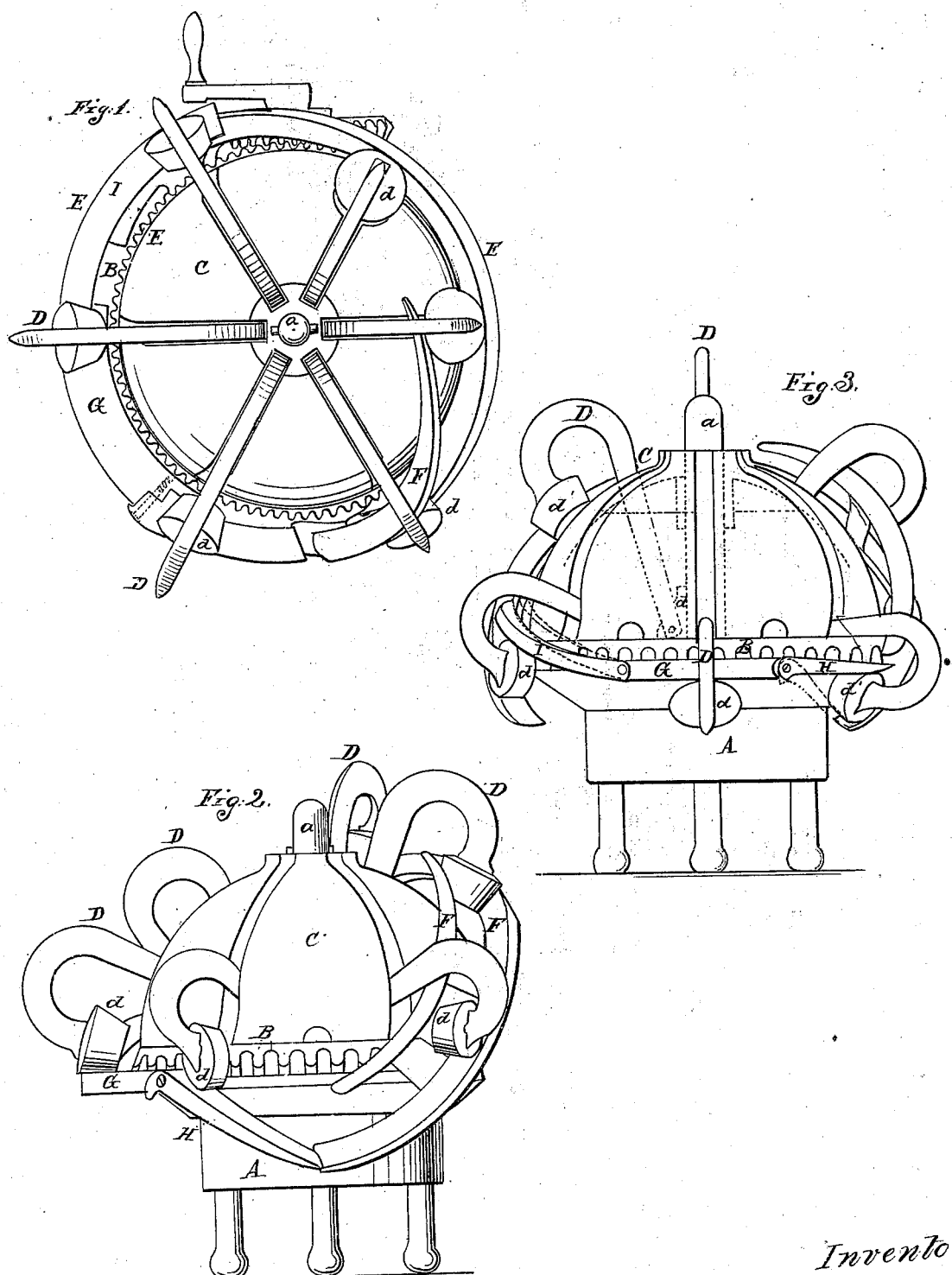

WILLIAM H. WARD, OF AUBURN, NEW YORK, ASSIGNOR TO JOHN A. DODGE, OF THE SAME PLACE.

IMPROVEMENT IN HARVESTER-RAKES.

Specification forming part of Letters Patent No. 91,582, dated June 22, 1869.

*To all whom it may concern:*

Be it known that I, WILLIAM H. WARD, of Auburn, in the county of Cayuga and State of New York, have invented certain new and useful Improvements in Harvester-Rakes, of which the following is a full, clear, and exact description, reference being had to the accompanying drawings, which make part of this specification, and in which—

Figure 1 represents a plan or top view of so much of the mechanism for driving a harvester-rake as is necessary to illustrate the invention herein claimed; Fig. 2, a view, in elevation, of the same as seen from the divider side of the machine; and Fig. 3, a diagram of the same as seen from the rear.

My invention relates to that class of combined reel and rake in which a series of independently-hinged rising and falling arms revolves around a vertical axis, and is more especially an improvement on the patent granted John A. Dodge, December 3, 1867.

A stand, A, mounted on the main frame, finger-beam, shoe, or platform of a harvester, supports a central pin, $a$, around which revolves a bevel-wheel, B, driven in any proper well-known way, and carrying a dome, C, divided into sections by vertical radial slots $c$. Arms D are pivoted at their inner ends to flanges $d$, Fig. 3, on a collar revolving with the bevel-wheel, so that each arm may play freely vertically (as it revolves around the pin) in its respective slot $c$. The outer ends of the arms are bent downward and inward, as shown in the drawings, and carry friction-rollers $d'$ on their outer ends. These rollers traverse in contact with guide-rails E F G. Each arm D is intended to carry a rake.

As the bevel-wheel B revolves in the direction shown by the arrows, the friction-roller on each arm in succession enters the track between the rails E F, and descends to lower the rake into the standing grain to sweep it back to the cutters and deposit it when severed on the platform. When the latch H remains in the position shown in black lines in the drawings, each roller, in succession, rolls up on it to the upper side of the rear guide-rail, G, and the rakes are lifted from the platform and pass over it without removing the gavel therefrom. When the gavel is to be discharged the driver lifts the latch H by devices similar to those shown in the Dodge patent above mentioned.

The first roller that comes along passes under the latch and traverses the under side of the rail G, thus holding the rake down upon the platform and discharging the gavel. As the gavel is discharged the roller strikes the rail E and rises on it, lifting the latch I, over which the rollers usually pass, the latch closing after the roller passes. Any number of rakes or beaters, from one to six, may be employed.

The slots allow a great range of vertical play to each arm independently of its fellows, and yet brace them strongly against lateral strains.

I claim—

1. The combination, as set forth, of the revolving radially-slotted dome with the independently-pivoted arms.

2. Also, the combination, as set forth, of the radially-slotted dome, the independently-pivoted arms, and the guide-rails E, F, and G.

3. Also, the combination, as set forth, of the revolving dome, the pivoted arms, and the guide-rails with the switch-latches, operating as described.

In testimony whereof I have hereunto subscribed my name.

W. H. WARD.

Witnesses:
HORACE T. COOK,
CHARLES WARD.